US012658767B2

(12) United States Patent
Gopalakrishnan et al.

(10) Patent No.: US 12,658,767 B2
(45) Date of Patent: Jun. 16, 2026

(54) METHOD AND SYSTEM FOR SENSING COMPONENT POSITION IN AN ELECTRIC DRIVE UNIT

(71) Applicant: GM Global Technology Operations LLC, Detroit, MI (US)

(72) Inventors: Suresh Gopalakrishnan, Troy, MI (US); Craig S. Ross, Ypsilanti, MI (US); Chandra S. Namuduri, Troy, MI (US); Chunhao J. Lee, Troy, MI (US); Thomas W. Nehl, Shelby Township, MI (US); Yulei Chen, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 18/480,655

(22) Filed: Oct. 4, 2023

(65) Prior Publication Data

US 2025/0119029 A1 Apr. 10, 2025

(51) Int. Cl.
H02K 11/215 (2016.01)

(52) U.S. Cl.
CPC .................................. H02K 11/215 (2016.01)

(58) Field of Classification Search
CPC .... H02K 11/215; H02K 11/22; H02K 11/225; H02K 11/21; H02K 21/021; H02K 21/028; H02K 2213/09
USPC ....................................................... 310/68 B
See application file for complete search history.

(56) References Cited

U.S. PATENT DOCUMENTS

| | | | | | |
|---|---|---|---|---|---|
| 5,602,957 A | * | 2/1997 | Wille | ................... | H01R 39/381 |
| | | | | | 318/248 |
| 2009/0206827 A1 | * | 8/2009 | Aimuta | ................ | G01D 5/2451 |
| | | | | | 324/207.25 |
| 2012/0229066 A1 | * | 9/2012 | Nonaka | ................... | H02K 29/08 |
| | | | | | 318/400.41 |
| 2013/0187504 A1 | * | 7/2013 | Tanaka | ................. | H02K 1/2706 |
| | | | | | 310/156.01 |
| 2014/0297117 A1 | * | 10/2014 | Near | ...................... | H02K 29/08 |
| | | | | | 701/37 |
| 2021/0276410 A1 | * | 9/2021 | Islam | ................... | B60K 7/0007 |

OTHER PUBLICATIONS

German Application No. 10 2023 133 747.5 filed Dec. 1, 2023; German Office Action dated Jun. 27, 2024; 6 pages.

* cited by examiner

*Primary Examiner* — Michael Andrews
(74) *Attorney, Agent, or Firm* — CANTOR COLBURN LLP

(57) ABSTRACT

An electric drive unit includes a housing and a rotor rotatably supported in the housing. The rotor includes a rotor shaft defining a rotor axis and a plurality of rotor laminations fixedly mounted to the shaft. The plurality of rotor laminations support a plurality of magnetic poles, and a hydraulic unit connected to the plurality of rotor laminations. The hydraulic unit has a magnetic shunt that is selectively shiftable relative to the plurality of magnetic poles. A position sensing system is operable to detect a rotational speed of the rotor and a position of the magnetic shunt relative to the plurality of magnetic poles. The position sensing system includes a rotor shaft position trigger coupled for rotation with the rotor shaft, and a magnetic shunt position trigger supported by the hydraulic unit.

20 Claims, 7 Drawing Sheets

METHOD AND SYSTEM FOR SENSING COMPONENT POSITION IN AN ELECTRIC DRIVE UNIT

INTRODUCTION

The subject disclosure relates to the art of vehicles and, more particularly, to a method and system for sensing component position in an electric drive unit.

Electric drive units include an electric motor having a rotor that is rotated within a stator supporting stator windings. The rotor supports magnetic poles that produce a magnetic field when rotated within the stator windings. Electric motors, such as variable geometry permanent magnet (PM) electric motors typically include magnetic shunts that are mounted in the rotor adjacent to the magnetic poles. The magnetic shunts are designed to mechanically weaken the magnetic field produced by the electric motor and, in so doing, reduce high speed back electro-motive force (EMF).

The position of the magnetic shunts relative to the magnetic poles is varied in real time in order to vary peak magnetic flux. In a first speed zone, typically below base speed, the magnetic shunts are positioned not to bridge the magnetic poles. At higher speeds, the magnetic shunts may be repositioned so as to bridge the magnetic poles and thereby weaken magnetic flux. Flux weakening is controlled by adjusting the position of the magnetic shunts relative to the magnetic poles.

Controlling the position of the shunts relative to the poles requires two sensors, one to detect shunt position, the other to detect pole position. The need for multiple sensors increases required packaging space, and the overall complexity of the motor and associated flux control. Accordingly, it is desirable to provide a system for sensing component position in an electric motor that relies on fewer sensors in order to reduce required packaging space, lower complexity, and reduce and/or eliminate potential failure points.

SUMMARY

An electric drive unit, in accordance with a non-limiting example, includes a housing having an inner surface, a stator fixedly supported in the housing, and a rotor rotatably supported in the housing. The rotor includes a rotor shaft defining a rotor axis and a plurality of rotor laminations fixedly mounted to the shaft. The plurality of rotor laminations support a plurality of magnetic poles, and a hydraulic unit connected to the plurality of rotor laminations. The hydraulic unit has a magnetic shunt that is selectively shiftable relative to the plurality of magnetic poles. A position sensing system is operable to detect a rotational speed of the rotor and a position of the magnetic shunt relative to the plurality of magnetic poles. The position sensing system includes a rotor shaft position trigger coupled for rotation with the rotor shaft, a magnetic shunt position trigger supported by the hydraulic unit, a first inductive sensor mounted to the housing and aligned with the rotor shaft position trigger, and a second inductive sensor mounted to the housing and aligned with the magnetic shunt position trigger.

In addition to one or more of the features described herein the inner surface of the housing includes a first axial end surface, a second axial end surface, and an annular inner surface extending between the first axial end surface and the second axial end surface, the first inductive sensor being mounted to the first axial end surface.

In addition to one or more of the features described herein the second inductive sensor is mounted to the first axial end surface adjacent to the first inductive sensor.

In addition to one or more of the features described herein the first inductive sensor is spaced from the rotor shaft position trigger by a first axial gap.

In addition to one or more of the features described herein the second inductive sensor is spaced from the magnetic shunt position trigger by a second axial gap.

In addition to one or more of the features described herein the first inductive sensor is spaced a first radial distance from the rotor axis and the second inductive sensor is spaced a second radial distance from the rotor axis, the second radial distance being greater than the first radial distance.

In addition to one or more of the features described herein the first inductive sensor is spaced 180° from the second inductive sensor relative to the rotor axis.

In addition to one or more of the features described herein a controller is operatively connected to the first inductive sensor and the second inductive sensor.

In addition to one or more of the features described herein an electronic circuit board is mounted to the first axial end surface and connected to the controller, the first inductive sensor and the second inductive sensor being mounted to and operatively connected with the electronic circuit board.

In addition to one or more of the features described herein the inner surface of the housing includes a first axial end surface, a second axial end surface, and an annular inner surface extending between the first axial end surface and the second axial end surface, the first inductive sensor and the second inductive sensor being mounted to the annular inner surface and being operable to detect the rotor shaft position trigger and the magnetic shunt position trigger across a radially extending gap.

A vehicle, in accordance with a non-limiting example, includes a body, a rechargeable energy storage system supported by the battery, and an electric drive unit supported in the body and electrically connected to the rechargeable energy storage system. The electric drive unit includes a housing having an inner surface, a stator fixedly supported in the housing, and a rotor rotatably supported in the housing. The rotor includes a rotor shaft defining a rotor axis and a plurality of rotor laminations fixedly mounted to the shaft. The plurality of rotor laminations support a plurality of magnetic poles, and a hydraulic unit connected to the plurality of rotor laminations. The hydraulic unit has a magnetic shunt that is selectively shiftable relative to the plurality of magnetic poles. A position sensing system is operable to detect a rotational speed of the rotor and a position of the magnetic shunt relative to the plurality of magnetic poles. The position sensing system includes a rotor shaft position trigger coupled for rotation with the rotor shaft, a magnetic shunt position trigger supported by the hydraulic unit, a first inductive sensor mounted to the housing and aligned with the rotor shaft position trigger, and a second inductive sensor mounted to the housing and aligned with the magnetic shunt position trigger.

In addition to one or more of the features described herein the inner surface of the housing includes a first axial end surface, a second axial end surface, and an annular inner surface extending between the first axial end surface and the second axial end surface, the first inductive sensor being mounted to the first axial end surface.

In addition to one or more of the features described herein the second inductive sensor is mounted to the first axial end surface adjacent to the first inductive sensor.

In addition to one or more of the features described herein the first inductive sensor is spaced from the rotor shaft position trigger by a first axial gap.

In addition to one or more of the features described herein the second inductive sensor is spaced from the magnetic shunt position trigger by a second axial gap.

In addition to one or more of the features described herein the first inductive sensor is spaced a first radial distance from the rotor axis and the second inductive sensor is spaced a second radial distance from the rotor axis, the second radial distance being greater than the first radial distance.

In addition to one or more of the features described herein the first inductive sensor is spaced 180° from the second inductive sensor relative to the rotor axis.

In addition to one or more of the features described herein a controller is operatively connected to the first inductive sensor and the second inductive sensor.

In addition to one or more of the features described herein an electronic circuit board is mounted to the first axial end surface and connected to the controller, the first inductive sensor and the second inductive sensor being mounted to and operatively connected with the electronic circuit board.

In addition to one or more of the features described herein the inner surface of the housing includes a first axial end surface, a second axial end surface, and an annular inner surface extending between the first axial end surface and the second axial end surface, the first inductive sensor and second inductive sensor being mounted to the annular inner surface and being operable to detect the rotor shaft position trigger and the magnetic shunt position trigger across a radially extending gap.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
FIG. 1 is a left side view of a vehicle including a variable geometry electric motor, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of select ones of the plurality of wheels 16. Vehicle 10 includes an electric drive unit 34 that provides power to one or more of the plurality of wheels 16.

A rechargeable energy storage system (RESS) or battery assembly 38 is arranged in body 12 and provides power to electric drive unit 34. In other arrangements, a fuel cell may be used to provide power to electric drive unit 34. At this point, it should be understood that the location of electric drive unit 34 and battery assembly 38 may vary. In a non-limiting example, electric drive unit 34 takes the form of a variable geometry electric motor 40. At this point, it should be understood that a variable geometry electric drive unit describes an electric motor including a movable magnetic member that may be shifted to vary a flux path between a rotor and a stator.

Figure 2:
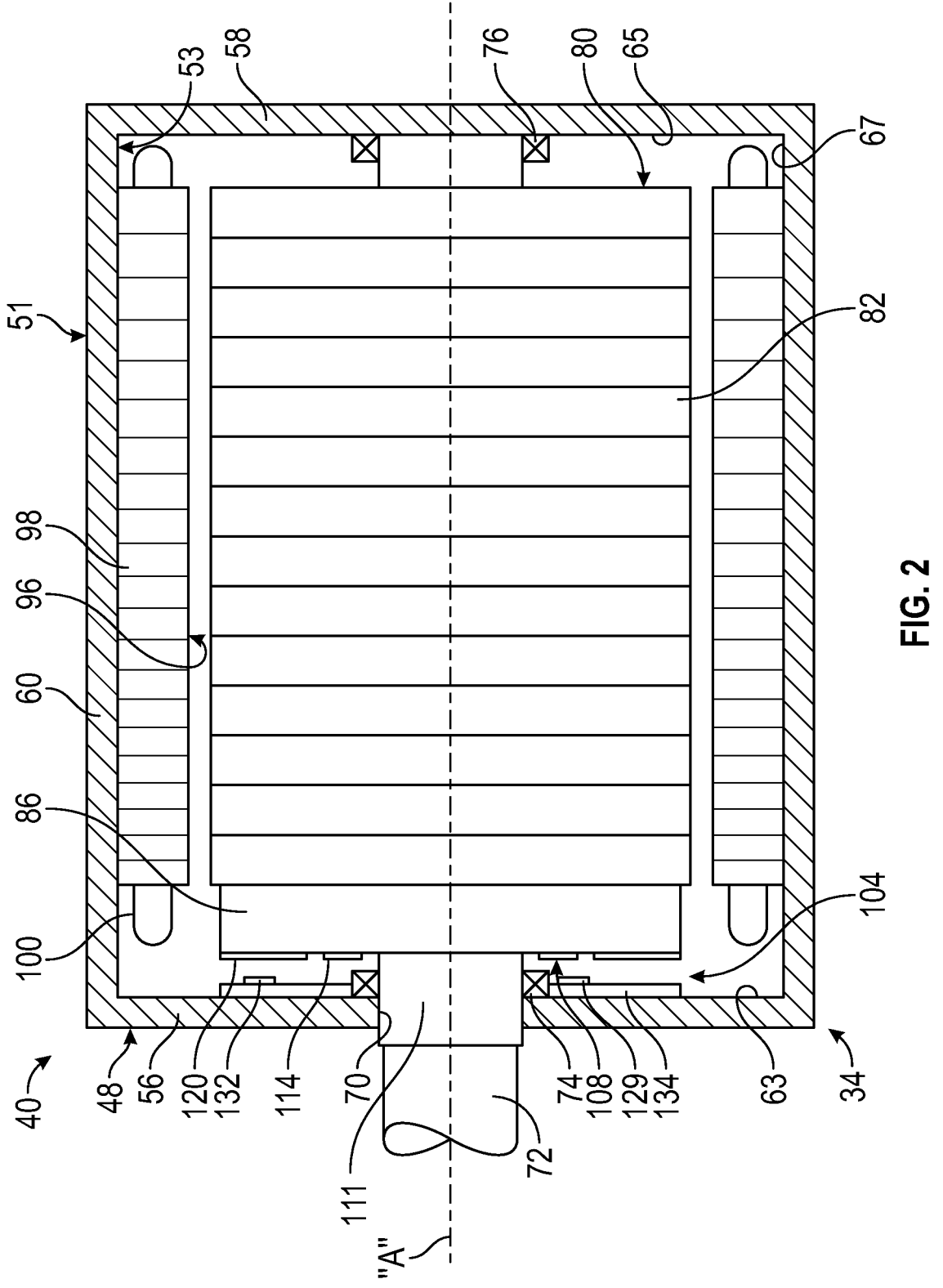
FIG. 2 is a cross-sectional side view of a variable geometry electric motor including a rotor position sensing system, in accordance with a non-limiting example.
Figure 3:
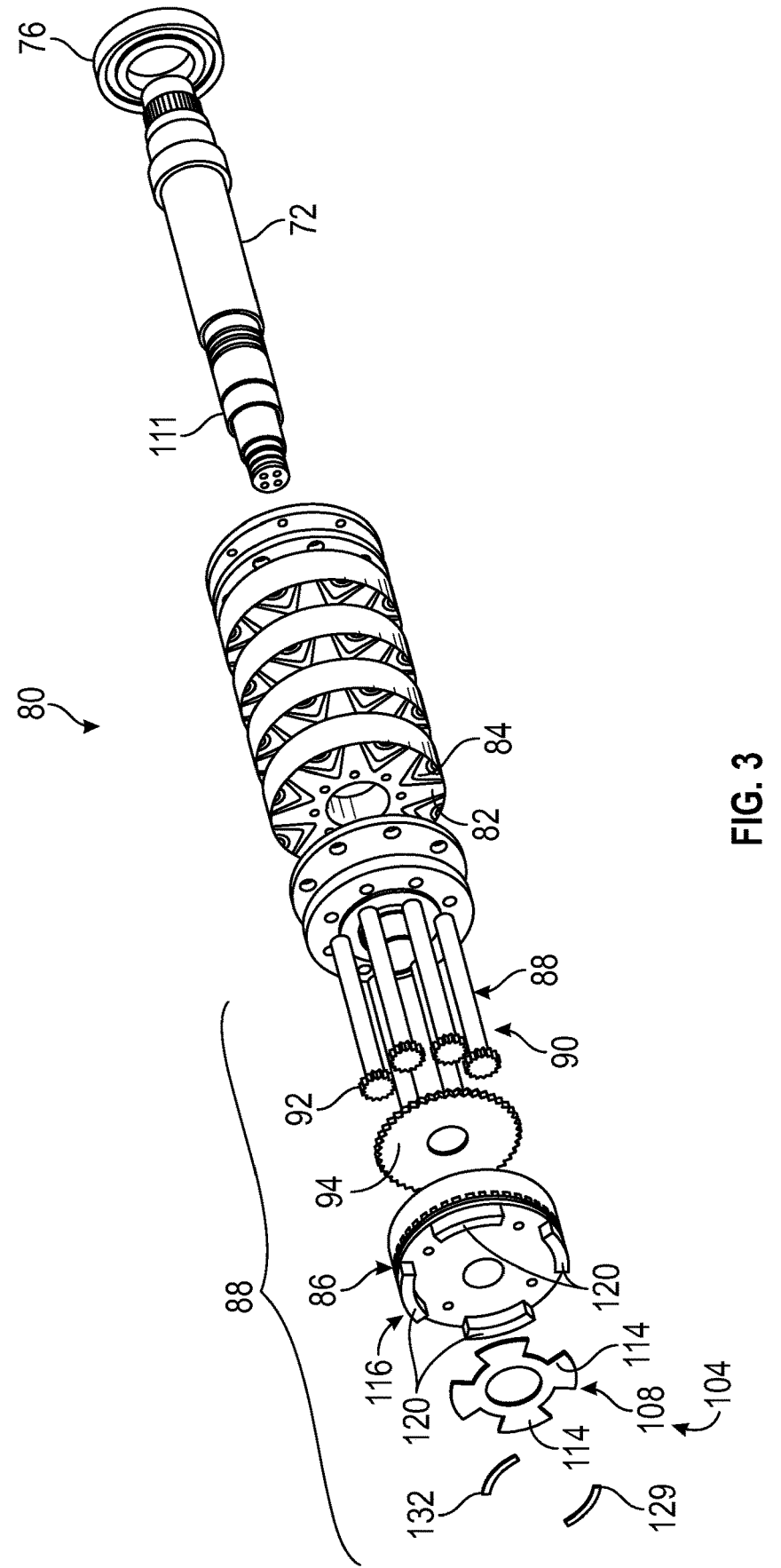
FIG. 3 is a disassembled view of the rotor of FIG. 2, in accordance with a non-limiting example.

Reference will now follow to FIGS. 2 and 3 in describing variable geometry electric motor 40 in accordance with a non-limiting example. Variable geometry electric motor 40 includes a housing 48 including an outer surface 51 and an inner surface 53. Housing 48 includes a first axial end wall 56, a second axial end wall 58, and an intermediate wall 60 that extends between and connects with first axial end wall 56 and second axial end wall 58. Inner surface 53 includes a first axial end surface 63 associated with first axial end wall 56, a second axial end surface 65 associated with second axial end wall 58, and an annular inner surface 67 associated with intermediate wall 60.

First axial end wall 56 includes an opening 70 that accommodates a rotor shaft 72 that extends through housing 48. Rotor shaft 72 defines a rotor axis "A" that extends through opening 70. Rotor shaft 72 is supported at first axial end wall 56 by a first bearing 74. Rotor shaft 72 is supported at second axial end wall 58 by a second bearing 76. Rotor shaft 72 supports a rotor 80 formed from a plurality of rotor laminations 82. Rotor laminations 82 support a plurality of magnetic poles 84 (FIG. 3).

Also shown in FIG. 3, rotor shaft 72 also supports a hydraulic unit 86 having a drive system 88. Hydraulic unit 86 includes a plurality of magnetic shunts 90. Drive system 88 includes a plurality of drive gears 92 that engages a drive gear 94. As will be detailed more fully herein, drive system 88 selectively operates drive gears 92 to rotate drive gear 94 to adjust a relative position of the magnetic shunts 90 supported by hydraulic unit 86 relative to the magnetic poles 84 supported by the plurality of rotor laminations 82.

In a non-limiting example, a stator 96 is mounted to annular inner surface 67. Stator 96 extends about rotor 80 and includes a plurality of stator laminations 98 that support stator windings 100. Electric energy, supplied by RESS 38 is passed though stator windings 100 to induce a magnetic field about rotor 80. The magnetic field interacts with the magnetic poles 84 supported in rotor laminations 82 causing rotor 80 to rotate and deliver drive energy to select ones of the plurality of wheels 16. In a non-limiting example, drive system 88 is selectively activated to adjust a relative position of magnetic shunts 90 and magnetic poles 84 in order to control back electro-motive force (EMF) of variable geometry electric motor 40 to more efficiently and reliably deliver energy to the select ones of the plurality of wheels 16.

Figure 4:
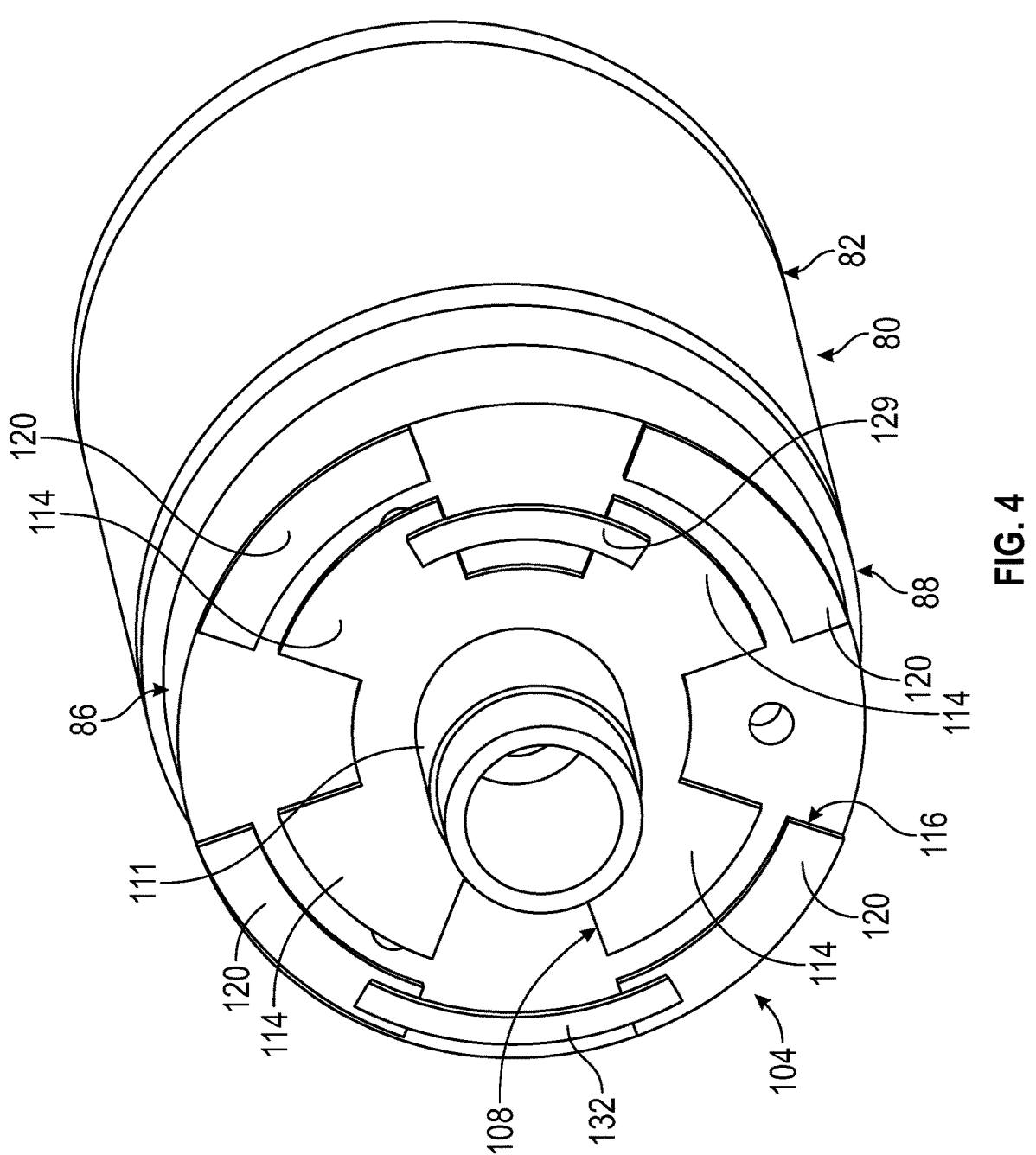
FIG. 4 is a perspective view of a rotor of the variable geometry electric motor of FIG. 1 and inductive sensors of the rotor position sensing system, in accordance with a non-limiting example.
Figure 5:
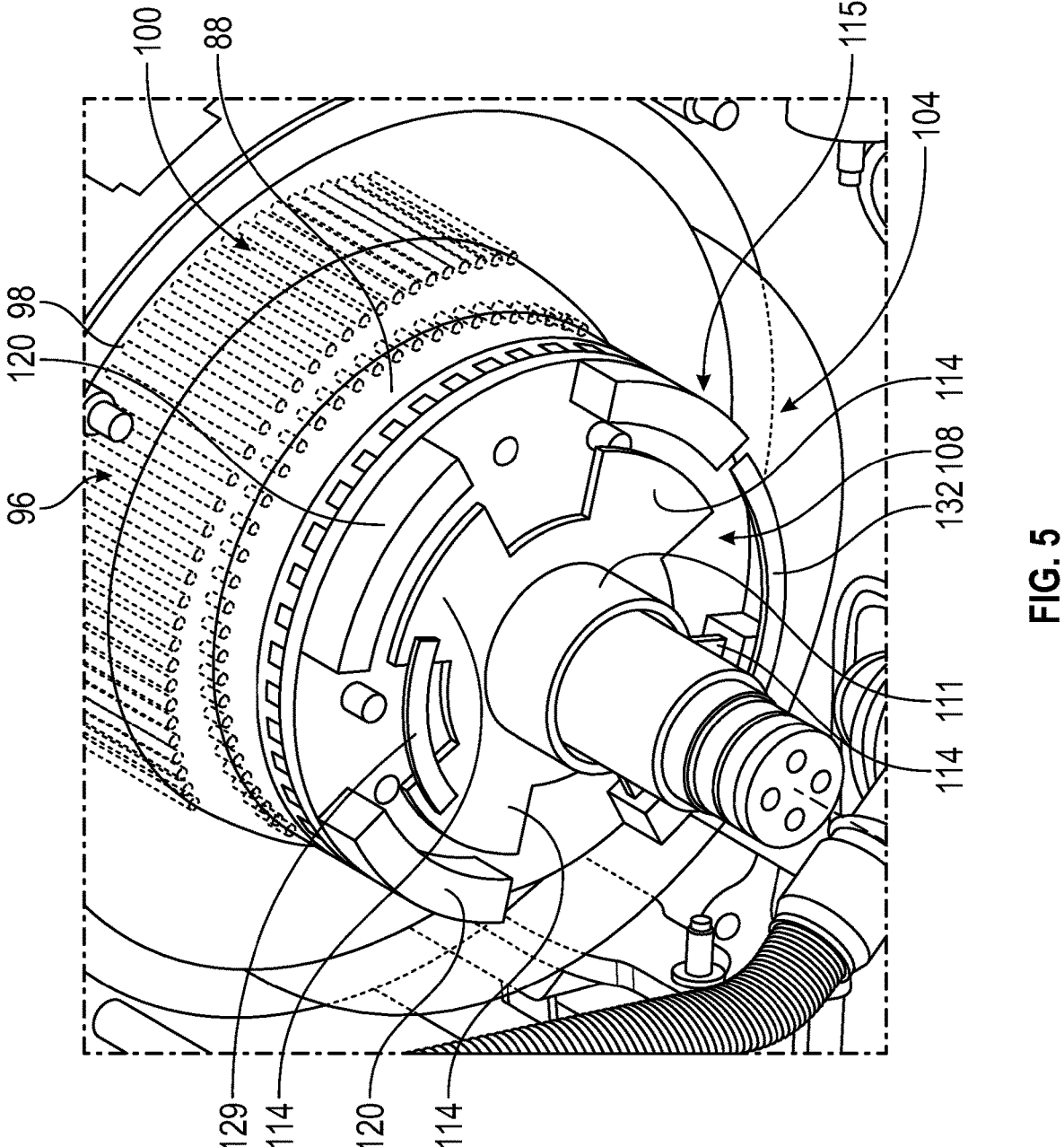
FIG. 5 is a partially disassembled perspective view of the rotor and variable geometry electric motor of FIG. 1, in accordance with a non-limiting example.

In a non-limiting example shown in FIGS. 3, 4, and 5 and with continued reference to FIG. 2, variable geometry electric motor 40 includes a position sensing system 104 operable to detect a rotational speed of rotor 80 as well as to determine a relative position of magnetic poles 84 and magnetic shunts 90. Position sensing system 104 includes a rotor shaft position trigger 108 operatively coupled for rotation with rotor shaft 72. Rotor shaft position trigger 108 is mounted to a central hub 111 connected to rotor shaft 72. Rotor shaft position trigger 108 also includes a plurality of rotor position trigger elements 114 that project radially outwardly from central hub 111.

Position sensing system 104 also includes a magnetic shunt position trigger 116 operatively coupled for rotation with hydraulic unit 86. Magnetic shunt position trigger 116 includes a plurality of magnetic shunt position trigger elements 120. Each of the plurality of rotor position trigger elements 114 and the plurality of magnetic shunt trigger elements 116 include structure that can induce an inductive response in an inductive sensor. At this point, it should be understood that while disclosed in connection with a variable geometry electric motor, position sensing system 104 may be used in other forms of electric motors where position sensing of motor components would be useful.

In a non-limiting example, position sensing system 104 includes a first induction sensor 129 shown mounted to first axial end surface 63 first axial end wall 56 of housing 48 and a second induction sensor 132 mounted to first axial end surface 63 of first axial end wall 56 of housing 48. In a non-limiting example, first induction sensor 129 and second induction sensor 132 are coupled to an electronic circuit board 134 mounted to first axial end surface 63 of first axial end wall 56. Of course, it should be understood that first induction sensor 129 and second induction sensor 132 may be mounted to different electronic circuit boards or mounted directly to first axial end surface 63 and connected to an electronic circuit board. Further, it should be understood that the depictions of first induction sensor 129 and second induction sensor 132 in FIGS. 4 and 5 are for illustrative purposes only. First induction sensor 129 and second induction sensor 132 should not be construed as being mounted to rotor 80.

Figure 6:
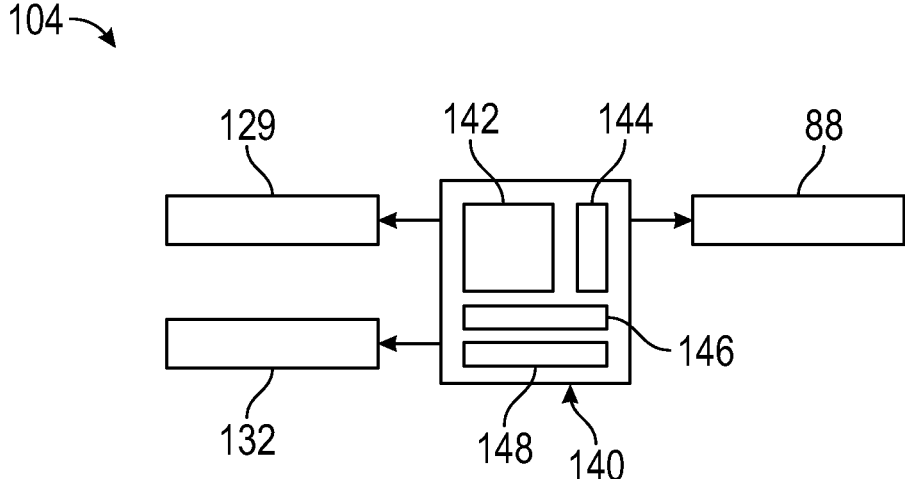
FIG. 6 is a block diagram illustrating a control system for the rotor position sensing system, in accordance with a non-limiting example.

Referring to FIG. 6 and with continued reference to FIGS. 2, 3, and 4, electronic circuit board 134 is connected to a controller 140 having a central processing unit (CPU) 142, a speed monitoring module 144, a position monitoring module 146, and an adjustment module 148. Controller 140 may signal drive system 88 to adjust a position of magnetic shunts 90 relative to magnetic poles 84 based on a rotational speed of rotor 80. That is, the relative position of magnetic shunts 90 and magnetic poles 84 is varied, in real time, to vary peak magnetic flux produced by variable geometry electric motor 40.

Figure 7:
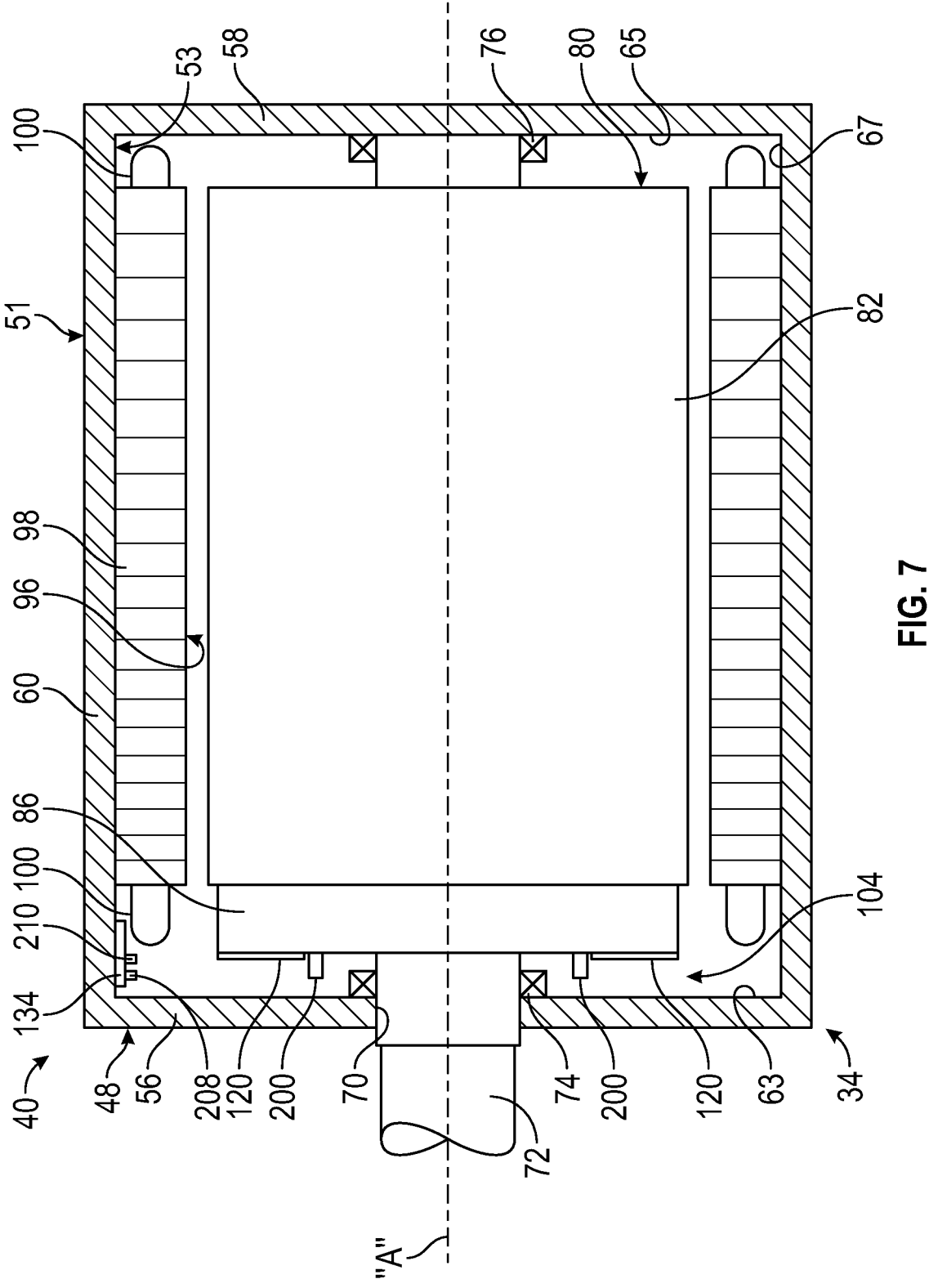
FIG. 7 is a cross-sectional side view of a variable geometry electric motor including a rotor position sensing system, in accordance with another non-limiting example.

Below base speed, magnetic shunts 90 will be positioned to as to not bridge magnetic poles 84. At higher speeds, drive system 88 will operate drive gears 92 to shift magnetic shunts 90 so as to bridge magnetic poles 84 and thereby weaken the magnetic flux. The amount of flux weakening may be adjusted based on the relative position of magnetic shunts 90 and magnetic poles 84. At this point, while shown as sensing rotor speed and magnetic shunt position across an axial gap (FIG. 2). Sensing may occur across a radial gap as shown in FIG. 7. Rotor 80 may include a rotor shaft position trigger 200 that projects axially outwardly of hydraulic unit 86. First and second induction sensors 208 and 210 may be arranged in annular inner surface 67.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric drive unit comprising:
   a housing having an inner surface;
   a stator fixedly supported in the housing;
   a rotor rotatably supported in the housing, the rotor including a rotor shaft defining a rotor axis, a plurality of rotor laminations fixedly mounted to the shaft, the plurality of rotor laminations supporting a plurality of magnetic poles, and a hydraulic unit connected to the plurality of rotor laminations, the hydraulic unit having a magnetic shunt that is selectively shiftable relative to the plurality of magnetic poles; and
   a position sensing system operable to detect a rotational speed of the rotor using a first inductive sensor and a position of the magnetic shunt relative to the plurality of magnetic poles using a second inductive sensor, the position sensing system comprising:
      a rotor shaft position trigger coupled for rotation with the rotor shaft wherein the rotor shaft position trigger comprises a central hub connected to the rotor shaft and a plurality of rotor position trigger elements projecting radially outward from the central hub;

a magnetic shunt position trigger supported by the hydraulic unit;

the first inductive sensor mounted to the housing and aligned with the rotor shaft position trigger;

the second inductive sensor mounted to the housing and aligned with the magnetic shunt position trigger;

a controller operatively connected to the first inductive sensor and the second inductive sensor, wherein the controller is configured to determine a position of the magnetic shunt using an output of the second inductive sensor and wherein the controller is configured to determine a rotational position of the shaft using an output of the first inductive sensor; and wherein the first inductive sensor is spaced 180° from the second inductive sensor relative to the rotor axis.

2. The electric drive unit according to claim 1, wherein the inner surface of the housing includes a first axial end surface, a second axial end surface, and an annular inner surface extending between the first axial end surface and the second axial end surface, the first inductive sensor being mounted to the first axial end surface.

3. The electric drive unit according to claim 2, wherein the second inductive sensor is mounted to the first axial end surface adjacent to the first inductive sensor.

4. The electric drive unit according to claim 3, wherein the first inductive sensor is spaced from the rotor shaft position trigger by a first axial gap.

5. The electric drive unit according to claim 4, wherein the second inductive sensor is spaced from the magnetic shunt position trigger by a second axial gap.

6. The electric drive unit according to claim 4, wherein the first inductive sensor is spaced a first radial distance from the rotor axis and the second inductive sensor is spaced a second radial distance from the rotor axis, the second radial distance being greater than the first radial distance.

7. The electric drive unit according to claim 1, wherein the magnetic shunt position trigger projects axially outward of the hydraulic unit beyond an axial end surface of the hydraulic unit.

8. The electric drive unit according to claim 1, further comprising an electronic circuit board mounted to the first axial end surface and connected to the controller, the first inductive sensor and the second inductive sensor being mounted to and operatively connected with the electronic circuit board.

9. The electric drive unit according to claim 1, wherein the inner surface of the housing includes a first axial end surface, a second axial end surface, and an annular inner surface extending between the first axial end surface and the second axial end surface, the first inductive sensor and the second inductive sensor being mounted to the annular inner surface and being operable to detect the rotor shaft position trigger and the magnetic shunt position trigger across a radially extending gap.

10. A vehicle comprising:

a body;

a rechargeable energy storage system supported by a battery; and an electric drive unit supported in the body and electrically connected to the rechargeable energy storage system, the electric drive unit comprising:

a housing having an inner surface;

a stator fixedly supported in the housing;

a rotor rotatably supported in the housing, the rotor including a rotor shaft defining a rotor axis, a plurality of rotor laminations fixedly mounted to the shaft, the plurality of rotor laminations supporting a plurality of magnetic poles, and a hydraulic unit connected to the plurality of rotor laminations, the hydraulic unit having a magnetic shunt that is selectively shiftable relative to the plurality of magnetic poles; and a position sensing system operable to detect a rotational speed of the rotor using a first inductive sensor and a position of the magnetic shunt relative to the plurality of magnetic poles using a second inductive sensor, the position sensing system comprising:

a rotor shaft position trigger coupled for rotation with the rotor shaft;

a magnetic shunt position trigger supported by the hydraulic unit, wherein the magnetic shunt position trigger projects axially outward of the hydraulic unit beyond an axial end surface of the hydraulic unit;

the first inductive sensor mounted to the housing and aligned with the rotor shaft position trigger;

the second inductive sensor mounted to the housing and aligned with the magnetic shunt position trigger;

a controller operatively connected to the first inductive sensor and the second inductive sensor, wherein the controller is configured to determine a position of the magnetic shunt using an output of the second inductive sensor and wherein the controller is configured to determine a rotational position of the shaft using an output of the first inductive sensor; and wherein the first inductive sensor is spaced 180° from the second inductive sensor relative to the rotor axis.

11. The vehicle according to claim 10, wherein the inner surface of the housing includes a first axial end surface, a second axial end surface, and an annular inner surface extending between the first axial end surface and the second axial end surface, the first inductive sensor being mounted to the first axial end surface.

12. The vehicle according to claim 11, wherein the second inductive sensor is mounted to the first axial end surface adjacent to the first inductive sensor.

13. The vehicle according to claim 12, wherein the first inductive sensor is spaced from the rotor shaft position trigger by a first axial gap.

14. The vehicle according to claim 13, wherein the second inductive sensor is spaced from the magnetic shunt position trigger by a second axial gap.

15. The vehicle according to claim 13, wherein the first inductive sensor is spaced a first radial distance from the rotor axis and the second inductive sensor is spaced a second radial distance from the rotor axis, the second radial distance being greater than the first radial distance.

16. The vehicle according to claim 10, wherein the rotor shaft position trigger comprises a central hub connected to the rotor shaft and a plurality of rotor position trigger elements projecting radially outward from the central hub.

17. The vehicle according to claim 16, further comprising an electronic circuit board mounted to the first axial end surface and connected to the controller, the first inductive sensor and the second inductive sensor being mounted to and operatively connected with the electronic circuit board.

18. The vehicle according to claim 10, wherein the inner surface of the housing includes a first axial end surface, a second axial end surface, and an annular inner surface extending between the first axial end surface and the second axial end surface, the first inductive sensor and the second inductive sensor being mounted to the annular inner surface and being operable to detect the rotor shaft position trigger and the magnetic shunt position trigger across a radially extending gap.

19. An electric drive unit comprising:

a housing having an inner surface;

a stator fixedly supported in the housing;

a rotor rotatably supported in the housing, the rotor including a rotor shaft defining a rotor axis, a plurality of rotor laminations fixedly mounted to the shaft, the plurality of rotor laminations supporting a plurality of magnetic poles, and a hydraulic unit connected to the plurality of rotor laminations, the hydraulic unit having a magnetic shunt that is selectively shiftable relative to the plurality of magnetic poles; and a position sensing system operable to detect a rotational speed of the rotor using a first inductive sensor and a position of the magnetic shunt relative to the plurality of magnetic poles using a second inductive sensor, the position sensing system comprising:

a rotor shaft position trigger coupled for rotation with the rotor shaft;

a magnetic shunt position trigger supported by the hydraulic unit, wherein the magnetic shunt position trigger projects axially outward of the hydraulic unit beyond an axial end surface of the hydraulic unit;

the first inductive sensor mounted to the housing and aligned with the rotor shaft position trigger;

the second inductive sensor mounted to the housing and aligned with the magnetic shunt position trigger;

a controller operatively connected to the first inductive sensor and the second inductive sensor, wherein the controller is configured to determine a position of the magnetic shunt using an output of the second inductive sensor and wherein the controller is configured to determine a rotational position of the shaft using an output of the first inductive sensor; and wherein the first inductive sensor is spaced 180° from the second inductive sensor relative to the rotor axis.

20. The electric drive unit of claim 19, wherein the inner surface of the housing includes a first axial end surface, a second axial end surface, and an annular inner surface extending between the first axial end surface and the second axial end surface, the first inductive sensor being mounted to the first axial end surface.

* * * * *